United States Patent [19]

Massholder et al.

[11] Patent Number: 5,573,676
[45] Date of Patent: Nov. 12, 1996

[54] PROCESS AND A DEVICE FOR THE DECOMPOSITION OF FREE AND COMPLEX CYANIDES, AOX, MINERAL OIL, COMPLEXING AGENTS, COD, NITRITE, CHROMATE, AND SEPARATION OF METALS IN WASTE WATERS

[75] Inventors: Karl F. Massholder, Altneudorf; Wilfried Werz; Erwin Ecker, both of Heidelberg, all of Germany

[73] Assignee: Ultra Systems GmbH UV-Oxidation, Heidelberg, Germany

[21] Appl. No.: 331,638

[22] PCT Filed: May 5, 1993

[86] PCT No.: PCT/EP93/01087

§ 371 Date: Feb. 24, 1995

§ 102(e) Date: Feb. 24, 1995

[87] PCT Pub. No.: WO93/22249

PCT Pub. Date: Nov. 11, 1993

[30] Foreign Application Priority Data

May 6, 1992 [DE] Germany .......................... 42 14 974.6

[51] Int. Cl.[6] ................. C02F 1/48; C02F 1/62; C02F 1/70; C02F 1/72
[52] U.S. Cl. .......................... 210/759; 210/748; 210/757; 210/759; 210/912; 210/913; 210/205
[58] Field of Search ................... 210/748, 759, 210/912, 757, 719, 720, 913, 198.1, 205

[56] References Cited

U.S. PATENT DOCUMENTS

| | | | |
|---|---|---|---|
| 4,792,407 | 12/1988 | Zeff et al. | 210/759 |
| 5,178,772 | 1/1993 | Daley et al. | 210/721 |
| 5,207,925 | 5/1993 | Sterner et al. | 210/759 |
| 5,238,581 | 8/1993 | Frame et al. | 210/748 |
| 5,348,665 | 9/1994 | Schulte et al. | 210/759 |
| 5,376,285 | 12/1994 | Kurek et al. | 210/759 |
| 5,439,599 | 8/1995 | Gehin et al. | 210/759 |

*Primary Examiner*—Neil McCarthy
*Attorney, Agent, or Firm*—Jacobson, Price, Holman & Stern, PLLC

[57] ABSTRACT

Process for the decontamination of decontaminants in waste waters, wherein the waste water stream to be treated pass sequentially through following process steps, waste water treatment with hydrogen peroxide ($H_2O_2$), irradiating at the same time with UV light, treatment with a reducing agent such as sodium dithionite, precipitation of existing metal contaminants, optionally followed by a filtration and/or a treatment with a selective ion exchanger.

13 Claims, 1 Drawing Sheet

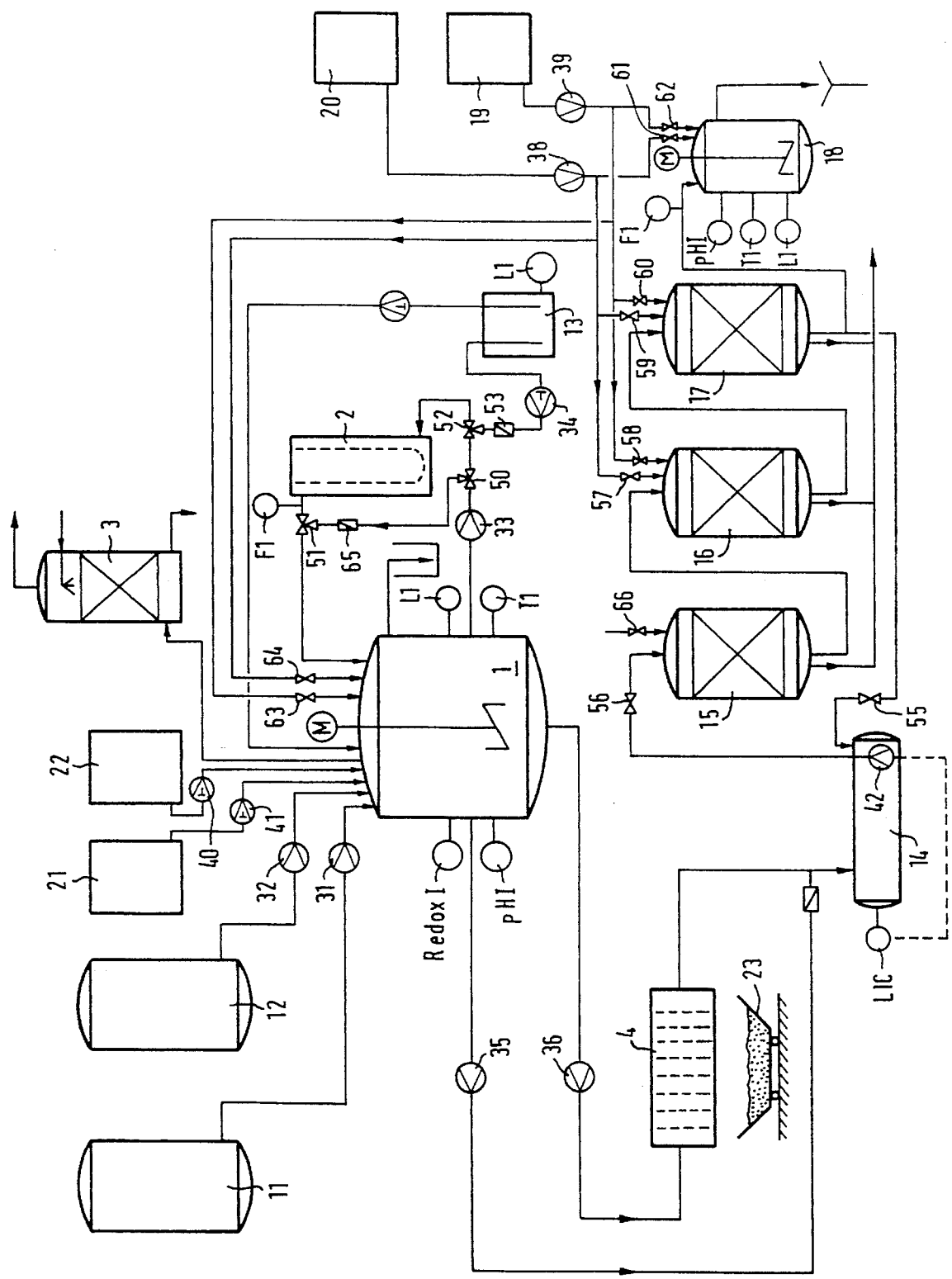

PROCESS AND A DEVICE FOR THE DECOMPOSITION OF FREE AND COMPLEX CYANIDES, AOX, MINERAL OIL, COMPLEXING AGENTS, COD, NITRITE, CHROMATE, AND SEPARATION OF METALS IN WASTE WATERS

The invention relates to a process and a device for the decomposition of contaminants in waste waters being loaded, for example, with cyanides, complexing agents, mineral oil, AOX, COD, chromate, nitrite, and further contaminants as metals.

A decontamination process widely used for the decontamination of waste waters loaded this way essentially consists of cyanide decontamination with chlorine bleaching leach and a subsequent reduction of chromate with sodium hydrogensulphite (Hartinger, Handbuch der Abwasser- und Recyclingtechnik, Hanser Verlag München, 2nd edition, pp 292 ff.).

The decontamination of cyanide with chlorine bleaching leach takes place at a pH value of 10 and is combined with a considerable salting. In addition, reacting of chlorine bleaching leach with organic ingredients such as brighteners and tensides leads to the formation of so-called absorbable organic substances (AOX).

The so-called easily releasable cyanides can be decontaminated quantitatively by this process. Complex cyanides, as those of copper and nickel, require a very long reaction time, whereas extremely strong complex cyanides as those of iron are not or not quantitatively decomposed.

Incompletely decomposed complex cyanides render the precipitation of the central atom as a hydroxide impossible and lead, by back dissociation, to an increase of free cyanide content (for this see Hartinger, Handbuch der Abwasser- und Recyclingtechnik, 2nd edition 1991, p 44). Additional complexing agents such as EDTA or NTA are not decomposed by chlorine bleaching leach.

Subsequent reduction of the chromate with sodium hydrogensulfite takes place after adjustment of the pH value to $\leq 2.5$ and is combined with another salting of the waste water. As cyanide decontamination by chlorine bleaching leach, chromate decontamination may be followed and also controlled by measuring the redox potential.

Using various devices, a waste water liberated from cyanides and chromates this way may be cleaned from dissolved metals by precipitating the corresponding hydroxides. For this as well unless this is not rendered impossible by the presence of additional complexing agents as EDTA or NTA being not decomposed by chlorine bleaching leach (Hartinger p 206 ff.), and provided that chromates were to be reduced—further addition of an auxiliary chemical—in this case a base—is required leading to further salting of the waste water.

Altogether easily releasable cyanides and chromates can be decomposed for certain using chlorine bleaching leach and sodium hydrogensulfite as decontamination process. However, for complex cyanides a quantitative decomposition is not achievable, such that the metals cannot be precipitated completely during hydroxide precipitation but are discarded in form of easily soluble complex cyanides into the waste water and contributing therefore to an increased metal loading.

Due to the chlorine bleaching leach and sodium hydrogensulfite treatment decontamination process the waste water becomes strongly saline due to the chlorine bleaching leach and the acids and bases required to adjust the pH value and particularly becomes loaded with AOX due to hydrochloric acid usage. An additional considerable AOX source consists of the unspecific reaction of chlorine bleaching leach with organic ingredients, so that the AOX limits of 1 mg/l and 0.5 mg/l, respectively, cannot be lowered as a rule. Consequently, up to the present these limits are postponed in galvanic industry.

Therefore attempts to modify the chlorine bleaching leach and sodium hydrogensulfite decontamination process or to replace it by other processes not suffering from the drawbacks mentioned above have not been spared. In this connection particularly it has been tried very often to replace chlorine bleaching leach, e.g., by hydrogen peroxide.

In this way DE 40 14 023 describes a process, during which the waste water is acidified, the hydrogen cyanide released this way swept off by means of an air stream and collected by an absorption liquid, e.g., sodium hydroxide solution. Then the cyanides can be decontaminated in this sodium hydroxide solution using chlorine bleaching leach without an AOX formation occuring. Cyanide decomposition would be achievable by other means like ozone or peroxygen compounds (hydrogen peroxide, sodium persulphate, potassium monoperoxosulphate compounds, (Caroat®)) as well. However, this is accompanied by an increased technical expenditure moreover giving rise to considerable problems concerning safety regulations being associated with the handling of possibly occuring extremely toxic hydrogen cyanide gases.

DE 27 09 722 describes a process, during which hydrogen cyanide is also swept out using acid and air. Decomposition of hydrogen cyanide takes then place in a flame.

Finally, the processes according to DE 29 53 005 A1, DE 24 39 189, and DE 35 27 589 propose usage of ozone for the decontamination of cyanide. Irrespective of the costly employment of ozone cyanides are intended to be decontaminated without AOX formation and salting. However, it is known from literature (e.g. Hartinger, Handbuch der Abwasser- und Recyclingtechnik, 2nd edition 1991, p 55) complex cyanides cannot be decomposed completely by ozone.

Consequently, attempts have not been spared to replace ozone by the combination air or oxygen plus catalyst as described in DE 27 45 301.

The proposed processes for the electrolytical decontamination of cyanides are extensive, e.g. DE 22 51 442 or DD 217 992 A1, by which the highly concentrated cyanide solutions can be decontaminated removing metals electrolytically at the same time. However, complete cyanide decontamination is not achievable employing these processes, so that a further decontamination of residual cyanide has to follow on that.

In the past attempts have not been spared to replace chlorine bleaching leach by hydrogen peroxide.

Contrary to chlorine bleaching leach, hydrogen peroxide reacts slower and even more incompletely with complex cyanides. In case that hydrogen peroxide is added too rapidly, an overfeeding will occur, accompanied with strong foaming leading the reaction vessel to foam over frequently, particularly in the presence of dissolved metals or metal hydroxides which decompose $H_2O_2$. Therefore this process did not find widespread application. Therefore it has been tried to enhance the poor reactivity of $H_2O_2$, e.g., by adding peroxo compounds such as Caroat® or by simultaneous irradiation of ultra violet radiation, as described in DE 35 01 528 with the goal of oxidizing organic compounds difficult to decompose such as complexing agents and heavy metal ions in waste waters. However, no technical realization can succeed employing this application for a protective right, as it has not been defined the ultra violet radiation neither regarding the wave length or the wave length range nor regarding intensity or a technical UV radiator with the exception of a 10th–75th excess of hydrogen peroxide.

Irrespective of the efforts described above in order to optimize the usage of chlorine bleaching leach to optimize the decontamination of cyanide or, respectively, to replace it by different reagents having at least the same reactivity, it remains the difficulty to decontaminate complex cyanides completely as well as the decomposition of further complexing agents, so that subsequent to the various processs of metal hydroxide precipitation the metal content in the treated waste waters could be lowered for certain below legal limits. A suitable technology to reduce chromates without the excessive usage of auxiliary chemicals such as acids and bases and to perform the precipitation of metals as metal hydroxides is needed as well up to the present.

It is the object of the invention to provide a process which avoids the drawbacks mentioned above and which ensures a secure treatment of waste waters charged with contaminants. In accordance with the invention this object is solved by a process having the features of claim 1.

The following dependent claims relate to preferred embodiments of the process according to the invention.

The decontamination of cyanides and further complexing agents preferably takes place in the alkaline region essentially using hydrogen peroxide and UV radiation of suitable wave length and intensity. For this treatment details are disclosed allowing the application of $H_2O_2$ technically and economically. On that a chromate reduction with sodium dithionite follows still in alkaline range, so that a pH adjustment and therefore acid employment may be omitted. On the contrary, the employed sodium dithionite decreases the pH value and leads this way towards the precipitation pH value to hydroxide precipitation, so that addition of an auxiliary chemical—a base in this case—may be reduced strongly. After having performed the metal hydroxide precipitation being conventional in the art the filtrate is directed over a selective ion exchanger and liberated there from further metals, so that the waste water to be released is liberated from cyanides, further complexing agents, metals, AOX, and the content of COD and mineral oil is reduced drastically. The solution regenerated from the selective ion exchangers may be reapplied at the beginning of the process. In both steps of the process employing $H_2O_2$ nitrite is converted to nitrate quantitatively.

Subsequent the process is described in detail for one embodiment comprising 5 process steps:

Step 1 Pretreatment of the waste water stream with hydrogen peroxide

Step 2 Treatment of the waste water stream with hydrogen peroxide and UV radiation of appropriate wave length(s) and intensity Step 3 Metal decontamination, in particular chromate decontamination with reducing agents such as sodium dithionite.

Step 4 Precipitation and separation of metal hydroxides in accordance with prior art Step 5 Treatment of the filtrate of step no. 4 by means of a selective ion exchanger Especially during the pretreatment step large amounts of easily releasable cyanides are decomposed.

Up to the present often an uncontrollable reaction took place due to improper application of hydrogen peroxide, leading beyond foaming to a strong foaming over of the reaction vessels. This foaming over is due to an unspecific decomposition—and therefore an uneconomical application—of $H_2O_2$ and possibly a reason for the prevention a broad application of this procedure.

In accordance with the invention one proceeds preferably as follows: The complete waste water inclusively of all opacities and precipitates is adjusted to a pH value of 10.0±1, usually preferring the higher pH value.

To this waste water stream is added batchwise $H_2O_2$ at moderate rate, e.g., 0.5–2 kg $H_2O_2$ (based on pure substance) per $m^3$ and hour, with strong stirring up. The metering rate is governed by the total metal content such that one doses at high metal concentrations with a lower rate. $H_2O_2$ is added until either foaming or a redox potential jump occurs. Foaming can be measured using a conventional electrode. Measurement of the redox potential is performed according to prior art. As soon as either foaming or the redox potential jump occurs, further addition of $H_2O_2$ is to be stopped. This may be performed automatically. While doing so, the pH value has to be kept above pH 8.

Normally thereby the content of fee cyanide is decomposed and the waste water stream is supplied to the following step of the treatment to decompose complex cyanides, further complexing agents, AOX and COD.

If the content of free cyanide is very low, this first step can be skipped. As it is possible that in waste waters of the galvanic industry very high metal concentrations occur, this pretreatment employing $H_2O_2$ should be performed batchwise in containers being filled only by about 70% and being equipped with an overflow and an additional container for taking up any residual volume.

During the subsequent procedure step any complex cyanides can be worked up. Even if the easily releasable cyanides have been decomposed completely, in the presence of certain metal ions and complex cyanides, e.g., as those of iron and nickel, after some time a release of easily releasable cyanides will occur. Therefore in these solutions a concentration of easily releasable cyanides according for example to the mass-action law will adjust itself (For this see Hartinger, table 3-1, p 44). This also shows in particular that in case of a high level of complex cyanides the majority of these has to be decomposed so that the concentration of easily releasable cyanides formed by the inevitable process of back dissociation is below the admissible limits.

The concentration limits of the metals are as well only to be kept, for example, by breaking up their bonds with complexing agents destroying the complexes and/or the complexing agents. Thereby those metal ions initially bonded to complexing agents are to be removed from the waste water by means of metal hydroxide precipitation.

In order to decompose complex cyanides as well as further complexing agents, AOX, and COD, the waste water stream to be treated (inclusively all cloudings and precipitats, too) is subjected to an UV oxidation with addition of $H_2O_2$.

$H_2O_2$ is added to the waste water stream and it is subjected to UV radiation having wave lengths and intensity as specified hereinafter. Employing batchwise treatment it has to be ensured that in the course of the reaction process the total container volume is led past the UV radiator(s) at least once.

Regardless whether this waste water stream has been subjected to a pretreatment or not addition of hydrogen peroxide is to be calculated so that the initial redox potential can be kept or shifted to the "opposite direction" after the UV oxidation. As the "opposite direction" the contrary change of the redox potential is to be understood which results from UV radiation alone (without adding $H_2O_2$).

A suitable UV radiation is in the range between 185 and 400 nm, whereby the corresponding technical UV radiators should have a minimum power density of 40 W/cm based on electrical power input.

The pH value can vary within wide ranges (pH>7- 2), the temperature can be from 10° C. to 60° C. so that normally neither the pH value nor the reaction temperature has to be adjusted. Particularly waste waters from metal producing and working industries or from galvanic plants do not need to be adjusted (by means of acid/base) to an optimum pH value. Existing cloudings and precipitates do not need to be separated before UV oxidation.

As soon as the measured redox potential remains constant, destruction of the complex cyanides and further complexing agents such as AOX, mineral oil, and COD, too, is completed and the waste water stream can be supplied to chromate decontamination.

A waste water treated as described above then can be supplied to chromate decontamination. Thereby chromate is reduced yielding trivalent chrome by adding reducing agents such as sodium dithionite. Addition of sodium dithionit is performed by measuring the redox potential.

By preference reducing agents such as sodium dithionite are employed being capable of cleaving complex cyanides as well which may be present in residual amounts. Cyanide released on this occasion can be decomposed in this step employing peroxygen compounds, e.g., $H_2O_2$ or salts of peroxo acids.

The pH value of this chromate decontamination may vary in the range pH 4- 12; to achieve this cloudings and precipitates have not to be separated.

Metal hydroxide precipitation is performed according to prior art with the aid of coagulation aids as as well the separation of metal hydroxides. Preferably separation of precipitates takes place after sedimentation by means of a chamber filter press. Due to the relatively low amounts of acid/base employed for the adjustment of the pH value the salt content is increased to a by far lesser extent so that as well a better filterability as also a longer service life of the filtration device, in particular of the chamber filter press filter cloths, results.

A waste water treated according to the invention contains after the separation of the precipitates still low amounts of dissolved metals eceeding possibly the legal limits.

To separate these residual metal amounts after step 4, the filtrate can be led over a selective ion exchanger, preferably of the LEWATIT TP 207 type of BAYER company. To this ion exchanger a gravel bed filter containing low contents of hydro anthracite as well can be installed before to retain turbidities.

Due to the essentially lowered content of neutral salts compared with conventional processs the ion exchanger can be employed by far more economically as the loading capacity is higher. After completion of loading the ion exchanger regenerated solution as well as the rinsing liquid of the gravel bed filter may be returned to the beginning of the procedure.

In the FIGURE the process according to the invention is illustrated by means of a flow scheme. According to the process in accordance with the invention the waste water treatment starts in reaction container 1 preferably equipped with an overflow container and an agitator. In reaction container 1 decontamination of the waste water from free cyanides, decomposition of complex cyanides, and reduction of metals with higher oxidation states is performed. For this the waste water to be treated, for example after an intermediate buffering in the receiver containers 11 and 12, is dumped by means of feed pumps 31 and 32. In a preferred embodiment reaction vessel 1 is equipped with devices to measure level, temperature, pH value as well as the redox potential in a suitable manner to control the treatment procedure. A device for controlling foam formation has proved successful, too. The reaction container preferably is equipped with an overflow and connected to waste gas washer 3. Thus even traces of unwanted gaseous products cannot escape.

After having filled reaction container 1 and having adjusted and controlled the necessary pH value the waste water stream is pumped by means of pump 33 via valves 50, 65, and 51 and treated with hydrogen peroxide. Dosing of hydrogen peroxide for example is performed employing metering pump 34 and three-way valve 52 with an appropriate feed speed until, for example, a redox potential jump measured in the reaction container occurs or foam formation begins.

After having decontaminated the waste water from free cyanides by means of hydrogen peroxide cleavage and decontamination of the complex cyanides can be performed in one or more UV reactors 2 by irradiating the waste water by means of UV radiation with supply of hydrogen peroxide. While doing so the waste water to be treated is recirculated between reaction container 1 and UV reactor 2 ensuring the complete volume of reaction container 1 is passed once or more than once through UV reactor 2 to termination of the decontamination reaction and to the point of reaching the final product the necessary amount of hydrogen peroxide is added and it is subjected to UV irradiation.

Having terminated decontamination of free and complex cyanides, preferably reduction of higher oxidized metal compounds employing reducing agents, for example of six-valent chrome employing sodium dithionite, can follow. The reduction is performed in reaction container 1 as well. Addition of the reducing agent such as sodium dithionite is performed preferably by a receiving container 22 and metering pump 31. In addition, it is possible to feed the reducing agent in case it is present as a solid, for example as a powder, to reaction container 1 by means of feeding means.

After termination of the higher oxidized metal ion reduction a further decontamination (of cyanide traces) can follow, for example by means of another oxidizing agent such as persulphate. For example, addition of the oxidizing agent such as persulphate can be accomplished via receiving container 21 and metering pump 41 or in any appropriate way.

After these reaction steps the precipitation and separation of metal hydroxides follows. This can be accomplished in any known way according to the art. The pH values to be adjusted, respectively, to condition the waste water or rather to precipitate the metallic decontaminants as hydroxides are controlled by adding bases or acids from storage vessels 19, 20 via metering pumps 38, 39, being connectable through valves 63 and 64, respectively. If necessary, addition of coagulation aids may be advantageous in promoting precipitation of the concerned metal oxides.

After having precipitated the metallic contaminants as hydroxides and after having sedimentated them, the clear phase is conveyed via fluid pump 35 directly into the pumping receiver of pump 14. The metal hydroxides themselves are withdrawn from the bottom of reaction container 1 and pressed off in chamber filter press 4. The filter cake then obtained from 4 is removed, for instance using a sludge wagon 23, and the filtrate is transferred to pumping receiver 14.

From the filtrate combined with the clear phase collected in pumping receiver 14, metal ions being present only in trace amounts may be separated. For this after separation of colloidal solid particles by means of a backwashable and activated carbon containing filter, preferably of a gravel bed filter 15, the combined water streams are led by means of fluid pump 52 over ion exchangers 16 and 17 and collected in final analysis container 18. Final analysis container 18 preferably has an agitator and a drain.

The ion exchanger materials are regenerated in a per se known manner and the regenerated solutions may be fed at the beginning of the process. The same is valid for the backwashable gravel bed filter.

Before releasing the waste water strem treated this way into the sewer the water collected in final analysis container 18 is checked for its contaminant level and adjusted to the permissable pH value if necessary.

The device for performing the process according to the invention possesses at least one reaction container 1. With this by means of inlets and drains at least one UV irradiation reactor 2 is connected in a way so that the waste water to be treated may be recirculated between the reaction container and the UV irradiation reactor 2. To develop a continuous arrangement of the actually discontinuous process preferably receiving containers 11 for the waste water to be treated are provided, in which for example galvanic waste waters can be stored temporarily. The hydrogen peroxide required for the treatment of the waste water according to the invention is stored in storage vessel 13. Consequently, preferably storage vessels 22 are designated for reducing agents such as dithionite as well. The storage vessels with the chemicals necessary to perform the reaction are connected to reaction container 1 via conduits.

Further installations of the device for performing the process in accordance with the invention are deducible from the FIGURE as well.

The following examples demonstrate the process according to the invention.

EXAMPLES 1 AND 2

Waste water streams I and II from galvanic plants were subjected to the waste water treatment without separating turbidities and metal hydroxide precipitates before. Performing this, the free cyanide content had to be lowered below the limit of 0.5 mg/l. Any further complexing agents were decomposed so that the metals could be precipitated as metal hydroxides and separated. AOX content was lowered below 1 mg/l. These waste waters did not contain any chromate making reduction with sodium dithionite unnecessary. Treatment of the waste waters was performed batchwise by adding 40 l peroxide in total (based on a 50% solution) and an UV radiator energy input of 5 kWh/m$^3$.

TABLE 1

Table 1 illustrates the measuring results of these experiments.

| | free cyanide (mg/l) | AOX (mg/l) | copper (mg/l) | zinc (mg/l) | nickel (mg/l) |
|---|---|---|---|---|---|
| I | | | | | |
| raw water | 428 | 1.3 | 70 | 425 | 1000 |
| final control shaft | 0.26 | 0.44 | 0.2 | <0.1 | <0.1 |
| II | | | | | |
| raw water | 1460 | 1.2 | 24 | 2020 | 275 |
| final control shaft | 0.1 | 0.4 | 0.1 | 0.2 | 0.2 |

EXAMPLE 3

A collected water from metal-working industry with a cyanide level of 10 g/l and a high level of chemical oxygen demand (COD) due to mineral oil and tenside decontaminations was treated. The waste water was free of turbidities. The content of free cyanide could be lowered to 0.02 mg/l and the content of COD could be lowered from 11000 mg/l to 2200 mg/l, corresponding to 81.8%. As no chromate was present in the solution, chromate reduction, precipitation of metal hydroxides as well as leading the waste water treated with UV oxidation and $H_2O_2$ over ion exchangers could be dispensed with. Collected water treatment was performed batchwise.

TABLE 2

| Collected water from metal-working industry | | |
|---|---|---|
| | free cyanide (mg/l) | chemical oxygen demand (mg/l) |
| raw water | 9 880 | 11 100 |
| after UV oxidation | 0.02 | 2 200 |

EXAMPLE 4

Disposal site leakage water colored slightly yellowish containing cyanides in amounts of 25 mg/l was liberated from cyanide by a continuous process to a very high degree. Cyanide concentration after UV treatment was 0.04 mg/l. For this purpose 1.5 l hydrogen peroxide were used per m$^3$ waste water applying 2 kWh/m$^3$ (calculated as UV radiator energy input) into the UV reactor. The decontamination process was controlled by measuring the redox potential.

EXAMPLE 5

Into a rinsing water from galvanic industry the metal content as well as the cyanide content was lowered below legal limits. The chromate present in the waste water was decomposed by reducing with sodium dithionite. Table 3 shows the concentrations of the contaminants in the raw water and in the final control shaft, respectively.

TABLE 3

| Rinsing water from galvanic industry | | | | |
|---|---|---|---|---|
| | free cyanide (mg/l) | copper (mg/l) | nickel (mg/l) | chrome (mg/l) |
| raw water | 172 | 1.9 | 45.0 | 1.3 |
| final control shaft | 0.003 | 0.3 | 0.1 | 0.1 |

LEGEND

Reactors:
  1: Reaction container with overflow container and agitator
  2: UV irradiation reactor
  3: Waste gas washing tower
  4: Chamber filter press for the batch reactor sediments
Containers:
  11: Plant waste water receiving container 1
  12: Plant waste water receiving container 2
  13: Hydrogen peroxide storage container
  14: Gravel bed filter and ion exchanger pumping receiver
  15: Gravel bed filter pressure container
  16: Selective ion exchanger 1 pressure container
  17: Selective ion exchanger 2 pressure container
  18: Final control container with agitator and drain to drainage channel
  19: Acid storage container
  20: Base storage container 21: Oxidizing agent solution storage container
22: Reducing agent solution storage container
23: Sludge waggon or container for removing of filter cake Pumps:
31: receiver centrifugal pump for 11
32: receiver centrifugal pump for 12
33: UV irradiation reactor feed pump
34: Metering pump to pump hydrogen peroxide into the UV irradiation cycle
35: Main water stream feed pump
36: Feed pump to pump the sediment stream to the chamber filter press
37: Metering pump to pump hydrogen peroxide into the batch reactor
38: Acid addition feed pump
39: Base addition feed pump
40: Reducing agent feed pump
41: Oxidizing agent feed pump
42: Feed pump Valves:
50, 51, 65: Three-way valves with swing check valve for the bypass of the UV irradiation reactor
52, 53: Hydrogen peroxide metering valve with swing check valve
54: Swing check valve
55: Eluate return valve
56: Mean stream stop cock during regeneration
57, 59, 61, 63: Acid addition valves
58, 60, 62, 64: Base addition valves
66: Backwash water cock

We claim:

1. A process for treating waste water that contains metal contaminants comprising the sequential steps of:

a first stage of treating the waste water with a combination of hydrogen peroxide and UV-light irradiation sufficient to effect cyanide-complex decontamination;

a second stage of treating the waste water with a reducing agent that is sufficient to effect chromate decontamination; and a third stage of precipitating the metallic contaminants and separation of the precipitants from the waste water.

2. The process of claim 1, further comprising, following the third stage, the step of subjecting the contaminant-separated waste water to ion exchange, sufficient to separate trace amounts of metal ions therefrom.

3. The process according to claim 1, further comprising, before the first stage, the step of adding hydrogen peroxide to the waste water, sufficient to effect free-cyanide decontamination.

4. The process according to claim 1, wherein the UV light has a wavelength of 185–400 nm.

5. The process according to claim 1, wherein the UV light has a minimum power density of 40 W/cm.

6. The process according to claim 1, wherein precipitating the metal contaminants is effected by hydroxide precipitation.

7. The process according to claim 1, further comprising, between the second and third stages, the step of treating the waste water with an oxidizing agent, sufficient to effect decontamination of cyanide traces.

8. The process according to claim 7 wherein the oxidizing agent is a persulfate.

9. The process according to claim 1, wherein the reducing agent is sodium dithionate.

10. The process of claim 1, further comprising, after the third stage, the step of filtering the precipitants to effect a filtrate.

11. The process of claim 10, further comprising the step of combining the filtrate with the contaminant-separated waste water.

12. The process of claim 11, further comprising the step of subjecting the combined filtrate and contaminant-separated waste water to ion exchange, sufficient to separate trace amounts of metal ions therefrom.

13. A device for treating waste water comprising:

(a) a reaction container;

(b) a UV light irradiation container connected to the reaction container by means for recirculating waste water between the reaction container and the irradiation container;

(c) at least one waste-water receiving container connected to the reaction container by a first conduit;

(d) a hydrogen peroxide storage container connected to the reaction container by a second conduit; and (d) a reducing agent storage container connected to the reaction container by a third conduit.

* * * * *